United States Patent
Sanfilippo et al.

(10) Patent No.: US 7,163,647 B2
(45) Date of Patent: Jan. 16, 2007

(54) PROCESS FOR THE PRODUCTION OF SYNTHESIS GAS FROM HEAVY CHARGES SUCH AS HEAVY CRUDE OILS AND DISTILLATION RESIDUES BY MEANS OF PARTIAL OXIDATION

(75) Inventors: Domenico Sanfilippo, Paullo (IT); Ivano Miracca, Milan (IT)

(73) Assignee: Snamprogetti S.p.A., San Donato Milanese (IT)

( * ) Notice: Subject to any disclaimer, the term of this patent is extended or adjusted under 35 U.S.C. 154(b) by 521 days.

(21) Appl. No.: 10/624,560

(22) Filed: Jul. 23, 2003

(65) Prior Publication Data
US 2005/0074395 A1  Apr. 7, 2005

(30) Foreign Application Priority Data
Jul. 26, 2002 (IT) .................... MI2002 A 001663

(51) Int. Cl.
  *C01B 3/02* (2006.01)
  *C01B 3/22* (2006.01)
  *C01B 3/24* (2006.01)
(52) U.S. Cl. .................... 252/373
(58) Field of Classification Search .......... 252/373
  See application file for complete search history.

(56) References Cited
U.S. PATENT DOCUMENTS 2,818,326 A * 12/1957 Eastman et al. .......... 48/212
4,605,423 A * 8/1986 Koog .......................... 48/69
4,704,137 A * 11/1987 Richter .................... 48/197 R
4,705,542 A * 11/1987 Gilmer .................... 95/210
6,833,013 B1 * 12/2004 Sanfilippo et al. ........ 48/198.5
2003/0047716 A1 * 3/2003 Tsang ........................ 252/373

* cited by examiner

Primary Examiner—Wayne A. Langel
(74) Attorney, Agent, or Firm—Oblon, Spivak, McClelland, Maier & Neustadt, P.C.

(57) ABSTRACT

Process for the production of synthesis gas from heavy charges comprising a partial oxidation of heavy charges with oxygen or air enriched in oxygen in the presence of vapour, carried out at temperatures higher than 1000° C. and pressures equal to or higher than 20 atm and the subsequent cooling of the synthesis gas obtained, by the direct injection of water into the gas itself followed by the separation of the water effected by means of an adduction pipe surrounded by a concentric tube open at both ends so as to form a ring through which the cooled gas and water can rise, characterized in that the distance (L) between the lower end of the adduction pipe and the lower end of the open concentric tube must be equal to or higher than x times the diameter (D) of said lower end of the adduction pipe, wherein x varies in relation to the specific gas mass flow-rate (F), expressed in kg/h/cm$^2$, according to the equation x=0.026 F+0.15.

1 Claim, 1 Drawing Sheet

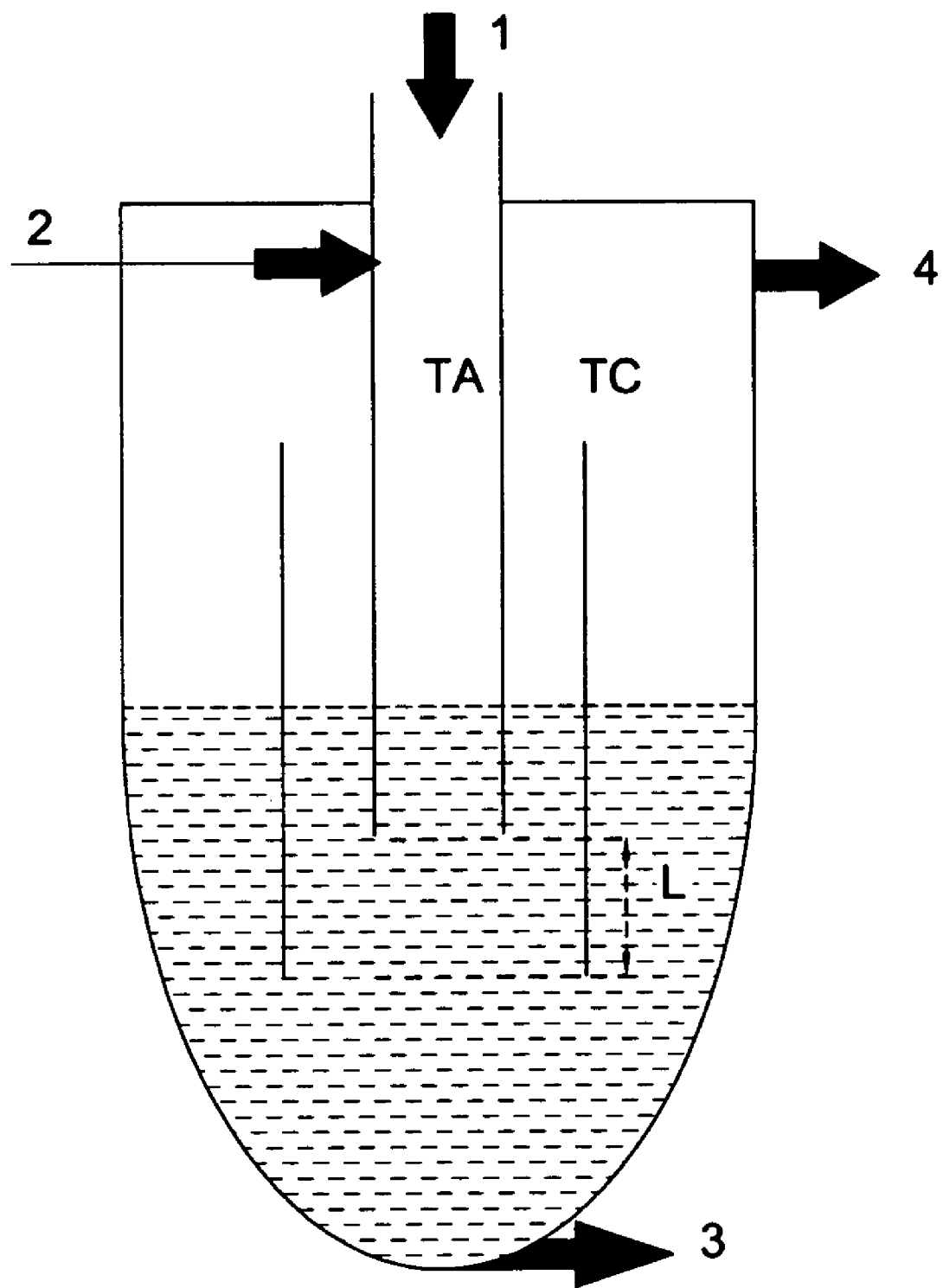

PROCESS FOR THE PRODUCTION OF SYNTHESIS GAS FROM HEAVY CHARGES SUCH AS HEAVY CRUDE OILS AND DISTILLATION RESIDUES BY MEANS OF PARTIAL OXIDATION

The present invention relates to a process for the production of synthesis gas, by means of partial oxidation, from heavy charges, among which heavy crude oils, bitumens from "oil sands" and distillation residues.

The conversion of heavy crude oils, bitumens from "oil sands" and petroleum residues into higher quality products can be substantially carried out by means of two methods: one exclusively thermal with the intermediate formation of synthesis gas, the other by means of hydrogenating treatment.

As far as the exclusively thermal method is concerned, the production of synthesis gas by bringing heavy charges to a high temperature (over 1000° C.) together with oxygen and a combustion moderator such as vapour, is already known.

At high temperatures, where all reactions reach equilibrium, the molar ratios $H_2$/CO which are obtained, typically maintain a high concentration of CO with a reduced formation of $CO_2$, which is the total carbon combustion product for any use to be made of this gas, whether it be for chemical uses, or whether it be burnt for producing electric energy in suitable combined cycle systems.

The gases formed at very high temperatures must be cooled to recover the heat contained and to enable them to be treated to remove, for example, the particulate of metals, sulfurated hydrogen and other compounds contained in the heavy charge.

The cooling can be effected by means of thermal exchange with suitable surfaces or by the direct injection of water thus favouring the separation of particulate or soot (carbonaceous particles obtained by the incomplete combustion of the heavy charge fed).

Numerous patents have been deposited in the field, among which U.S. Pat. No. 2,828,326, U.S. Pat. No. 3,980,950, U.S. Pat. No. 4,605,423, U.S. Pat. No. 4,705,542, U.S. Pat. No. 4,704,137, can be mentioned in particular.

From these patents, it can be noted how important it is to know and maintain the $H_2$/CO molar ratio as constant as possible: this however causes a serious problem as said ratio, which has an approximate value of less than 1, tends to rise to values higher than 1 with an evident influence on the subsequent use of the gas.

U.S. Pat. No. 2,818,326 describes a process for the production of synthesis gas by the partial oxidation of carbonaceous fuels with a gas containing oxygen and a subsequent cooling of the synthesis gases obtained by means of the direct injection of water into the gas itself followed by the separation of the water using an adduction pipe surrounded by a concentric tube open at both ends so as to form a ring through which the cooled gas and water can rise. In particular, this patent recommends cooling the hot gas discharged at over 2000° F. to 600° F. in a very short period of time, not specified, in order to prevent degradation reactions which generally lead to the formation of free carbon and hydrocarbons.

U.S. Pat. No. 4,705,542 comprises the disclosures of the previous patent recommending an operating rate of 2 to 9 m/sec and cooling with a contact time of 0.1 to 1 seconds, preferably from 0.1 to 0.5 seconds.

In spite of what is described in the above two patents, and although the cooling is effected by the addition of liquid water and with the brief cooling times suggested, it can be found that this is not sufficient to guarantee a correct functioning of the process itself.

It is known, in fact, that, in addition to the degradation reactions mentioned above, among which the Bouduart reaction

$$2CO \leftrightarrow C + CO_2 \ (\Delta H° = -173 \text{ kJ/mole})$$

which also has the disadvantage of the formation of solid carbonaceous particles, the addition of water favours a water gas shift (WGS) reaction

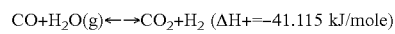
$$CO + H_2O(g) \leftrightarrow CO_2 + H_2 \ (\Delta H + = -41.115 \text{ kJ/mole})$$

The time necessary for reaching a temperature of about 900° C. at which the WGS reaction is sufficiently slow as to allow numerous possible options to be selected, is particularly critical.

As a result of the thermodynamics, this reaction tends to proceed towards the right due to the increasingly lower temperatures.

The gas thus obtained has a lower heat power, a higher hydrogen content, a lower CO content and an increased concentration of $CO_2$.

In the absence of an effective cooling for controlling the composition of the gas, it is necessary to effect the gasification with a lower quantity of vapour.

All of this leads to various drawbacks among which the most important are:
the formation of soot
the loss of thermal capacity due both to the exothermic WGS reaction and to the eliminated soot formed (which is also dangerous waste)
erosion and/or corrosion which results in the use of more expensive materials.

All of these disadvantages cause discontinuity in the functioning of the process.

When the cooling is carried out by the direct injection of water whose addition helps to remove the soot, it has been noted however in the apparatus, where the jet of descending gas penetrates the underlying liquid, that high temperature bubbles are formed, poorly distributed in the liquid, thus expecting to cause the malfunctioning of the apparatus (foaming, non-regulation of the level, entrainment of liquid water together with the gas, entrainment of the gas into the aqueous phase).

In order to avoid the above drawbacks and at the same time reduce the formation of bubbles under conditions of high turbulence on the whole mass of water separated, we have found that the distance between the lower end of the adduction pipe and the lower end of the open concentric tube must be equal to or higher than certain values depending on the diameter of the lower end of the adduction pipe and on the specific flow-rate of gas mass, thus preventing the jet of gas from penetrating beyond the lower end of said open concentric tube.

The process, object of the present invention, for the production of synthesis gas from heavy charges comprises a partial oxidation of said heavy charges with oxygen or air enriched in oxygen in the presence of vapour carried out at temperatures higher than 1000° C. and pressures preferably equal to or higher than 20 atm and the subsequent cooling of the synthesis gas obtained, by the direct injection of water into the gas itself followed by the separation of the water effected by means of an adduction pipe surrounded by a concentric tube open at both ends so as to form a ring through which the cooled gas and water can rise, characterized in that the distance (L) between the lower end of the adduction pipe and the lower end of the open concentric tube must be equal to or higher than x times the diameter (D) of said lower end of the adduction pipe, wherein x varies in relation to the specific gas mass flow-rate (F), expressed in kg/h/cm$^2$, according to the equation x=0.026 F+0.15.

The heavy charges treated can be of different origins: they can be selected from heavy crude oils, distillation residues, heavy oils coming from catalytic treatment, for example heavy cycle oils from catalytic cracking treatment, thermal tars (coming, for example, from visbreaking or similar thermal processes), bitumens from oil sands, various kinds of coals and any other high-boiling charge of a hydrocarbon nature generally known in the art as "black oils".

A preferred embodiment of the present invention is provided hereunder with the help of the enclosed figure, which however should in no way be considered as representing a limitation of the scope of the invention itself.

The figure schematizes the case in which the cooling of the synthesis gas with carbonaceous particles (1), obtained from the partial oxidation of a heavy charge, is effected by the direct injection of water (2) into the gas itself, followed by the separation of the water in a suitable container (R) by means of an adduction pipe (TA) surrounded by a concentric tube (TC) open at both ends so as to form a ring through which the cooled gas and water can rise.

The distance (L) between the lower end of the adduction pipe and the lower end of the open concentric tube must be equal to or higher than x times the diameter (D) of said lower end of the adduction pipe, wherein x varies in relation to the specific gas mass flow-rate (F), expressed in kg/h/cm$^2$, according to the equation x=0.026 F+0.15.

The water is removed from the container together with the carbonaceous particles from the bottom (3) whereas the cooled synthesis gas is discharged from a lateral point (4).

Some examples are provided hereunder, which however should in no way be considered as forming a limitation of the scope of the present invention.

EXAMPLE 1

A partial oxidation is carried out on a feeding of 30 t/h of heavy charges consisting of asphaltene residues, with 31 t/h of oxygen in the presence of 19 t/h of vapour, at a temperature of 1350° C. and a pressure of 72 atm, obtaining 96200 Nm$^3$/h of synthesis gas, which is cooled by the direct injection of water into the gas itself, with the partial evaporation of the water, which increases the flow-rate of the gaseous phase to 117500 Nm$^3$/h, followed by the separation of the liquid water carried out according to the scheme of the enclosed figure wherein the diameter of the lower end of the adduction pipe D is equal to 0.8 m.

As the flow-rate F=18.79 kg/h/cm$^2$, x has the value of 0.64 and the distance L must be equal to or higher than 0.51 m.

After selecting the distance L=0.55 m, it can be seen how the functioning of the system is regular, without any problems of foaming, without the formation of gaseous bubbles in the liquid mass outside the concentric tube or difficulties in regulating the level, confirming that the gaseous phase almost totally rises in the ring between the adduction pipe and the concentric tube, without influencing the recipient containing the liquid phase.

EXAMPLE 2

A partial oxidation is carried out on a feeding of 30 t/h of heavy charges consisting of asphaltene residues, with 31 t/h of oxygen in the presence of 19 t/h of vapour, at a temperature of 1350° C. and a pressure of 72 atm, obtaining 96200 Nm$^3$/h of synthesis gas, which is cooled by the direct injection of water into the gas itself, with the partial evaporation of the water, which increases the flow-rate of the gaseous phase to 117500 Nm$^3$/h, followed by the separation of the liquid water carried out according to the scheme of the enclosed figure wherein the diameter of the lower end of the adduction pipe D is equal to 0.6 m.

As the flow-rate F=33.40 kg/h/cm$^2$, x has the value of 1.02 and the distance L must be equal to or higher than 0.61 m.

After selecting the distance L=0.65 m, it can be seen how the functioning of the system is regular, without any problems of foaming, without the formation of gaseous bubbles in the liquid mass outside the concentric tube or difficulties in regulating the level, confirming that the gaseous phase almost totally rises in the ring between the adduction pipe and the concentric tube, without influencing the recipient containing the liquid phase.

EXAMPLE 3 (COMPARATIVE)

A partial oxidation is carried out on a feeding of 30 t/h of heavy charges consisting of asphaltene residues, with 31 t/h of oxygen in the presence of 19 t/h of vapour, at a temperature of 1350° C. and a pressure of 72 atm, obtaining 96200 Nm$^3$/h of synthesis gas, which is cooled by the direct injection of water into the gas itself, with the partial evaporation of the water, which increases the flow-rate of the gaseous phase to 117500 Nm$^3$/h, followed by the separation of the liquid water carried out according to the scheme of the enclosed figure wherein the diameter of the lower end of the adduction pipe D is equal to 0.8 m.

With a distance of L=0.45 m, it can be seen how the functioning of the system becomes irregular and the regulation of the level in the container difficult, due to the presence of gaseous phase, in the form of large bubbles, which bubbles up into the liquid phase outside the concentric tube, instead of into the ring between the adduction pipe and concentric tube.

What is claimed is:

1. A process for production of synthesis gas from heavy charges comprising:
    partially oxidizing heavy charges with oxygen or air enriched in oxygen in a presence of vapour carried out at temperatures higher than 1000° C. and pressures equal to or higher than 20 atm;
    cooling, after partially oxidizing, a synthesis gas obtained, by directly injecting water into the synthesis gas itself followed by separating water effected by means of an adduction pipe surrounded by an open concentric tube open at both ends so as to form a ring through which cooled gas and water can rise,
    wherein a distance (L) between a lower end of the adduction pipe and a lower end of the open concentric tube must be equal to or higher than x times a diameter (D) of said lower end of said adduction pipe,
    wherein x varies in relation to a specific gas mass flow-rate (F), expressed in kg/h/cm$^2$, according to the equation x=0.026 F+0.15.

* * * * *